(12) United States Patent
Kay

(10) Patent No.: US 9,564,178 B2
(45) Date of Patent: Feb. 7, 2017

(54) APPARATUS AND METHOD FOR SUPPORTING STORAGE DEVICES DURING MANUFACTURE

(71) Applicant: Xyratex Technology Limited, Havant (GB)

(72) Inventor: Alexander Kay, Southsea (GB)

(73) Assignee: Seagate Technology LLC, Cupertino, CA (US)

( * ) Notice: Subject to any disclaimer, the term of this patent is extended or adjusted under 35 U.S.C. 154(b) by 735 days.

(21) Appl. No.: 13/850,974

(22) Filed: Mar. 26, 2013

(65) Prior Publication Data

US 2014/0290023 A1    Oct. 2, 2014

(51) Int. Cl.
*B23P 19/04* (2006.01)
*G11B 33/12* (2006.01)

(52) U.S. Cl.
CPC ........ *G11B 33/128* (2013.01); *Y10T 29/49764* (2015.01); *Y10T 29/49817* (2015.01); *Y10T 29/49998* (2015.01)

(58) Field of Classification Search
CPC .............. B21F 27/20; B25B 5/14; B27F 7/13; B27F 7/155; B27F 7/17
See application file for complete search history.

(56) References Cited

U.S. PATENT DOCUMENTS

| | | | | |
|---|---|---|---|---|
| 6,487,071 B1* | 11/2002 | Tata | ...................... | G11B 33/08 235/487 |
| 7,298,624 B2* | 11/2007 | Boswell | .................. | G06F 1/182 361/679.55 |
| 2005/0007896 A1* | 1/2005 | Haas | ..................... | G11B 17/225 369/30.6 |
| 2007/0211423 A1* | 9/2007 | Huang | .................... | G06F 1/187 361/679.39 |
| 2014/0290023 A1* | 10/2014 | Kay | ..................... | G11B 33/128 29/407.01 |

FOREIGN PATENT DOCUMENTS

| WO | 2006/030185 | 3/2006 |
|---|---|---|
| WO | 2010/139973 | 12/2010 |
| WO | 2010/139989 | 12/2010 |
| WO | 2012/030481 | 3/2012 |

* cited by examiner

*Primary Examiner* — Lee D Wilson
(74) *Attorney, Agent, or Firm* — Westman, Champlin & Koehler, P.A.

(57) ABSTRACT

There is disclosed an apparatus and method for supporting storage devices during manufacture. The apparatus includes structural members and plural slot carriers received in bays in the apparatus. Each slot carrier carries at least one slot arranged to receive a storage device, wherein the slot carriers are insertable and/or removable from the bays through apertures at the front of the apparatus. Clamp assemblies are arranged to releasably clamp the slot carrier to one or more structural members at the sides of the slot carrier.

14 Claims, 17 Drawing Sheets

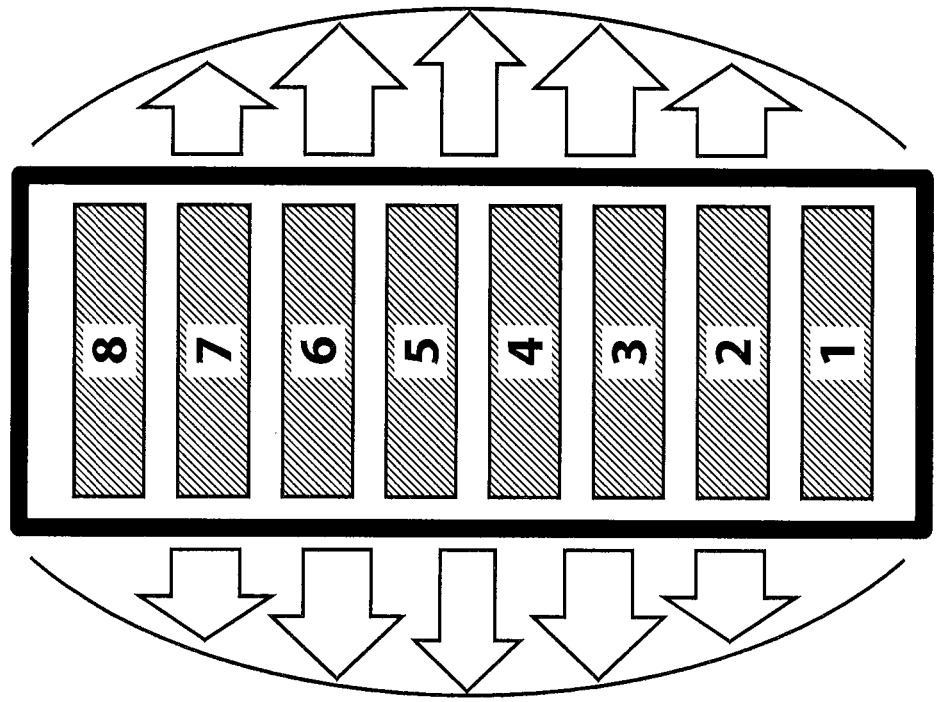
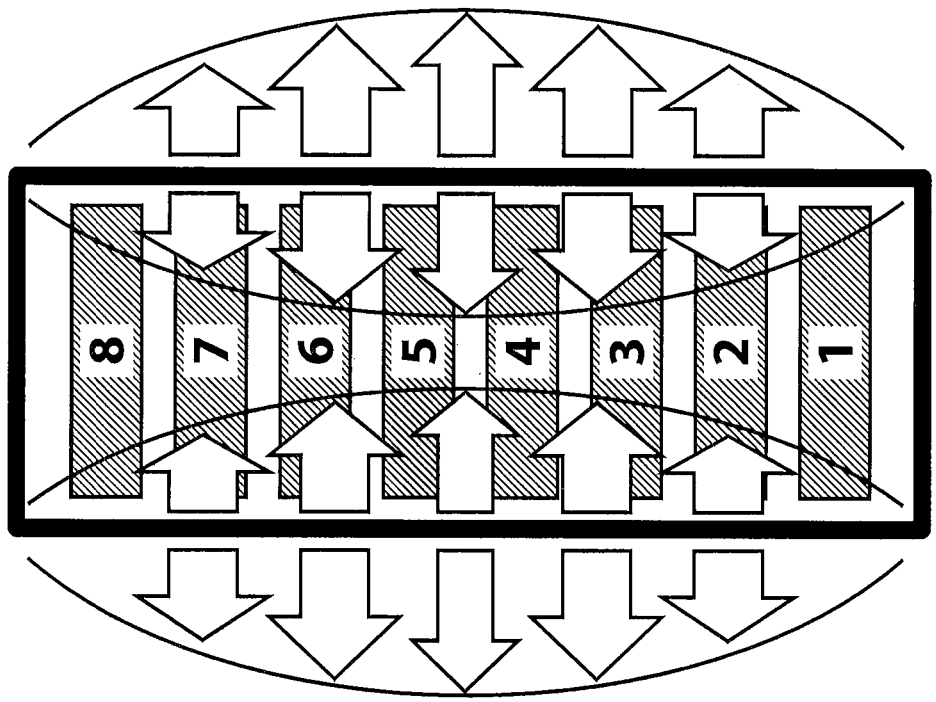
Fig. 2B
PRIOR ART
Fig. 2A
PRIOR ART

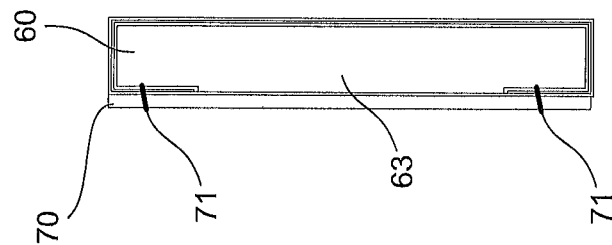
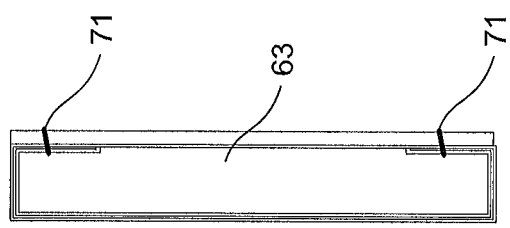
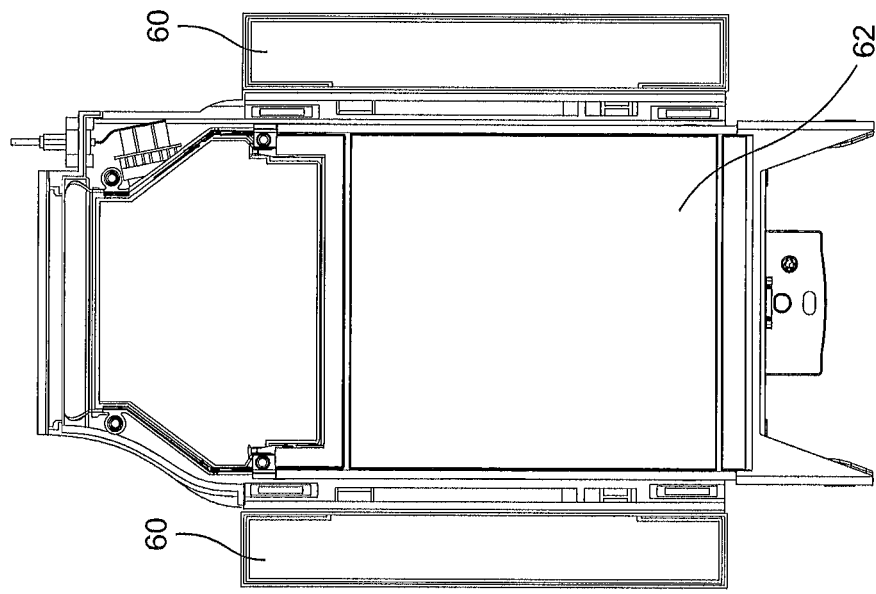

DETAIL 'A'

DETAIL 'A'

APPARATUS AND METHOD FOR SUPPORTING STORAGE DEVICES DURING MANUFACTURE

This application claims the benefit of priority to U.S. application Ser. No. 61/625,451, filed Apr. 17, 2012, the content of which is hereby incorporated by reference.

The present invention relates to an apparatus for supporting storage devices during manufacture and to a method of supporting storage devices during manufacture During manufacture of a storage device, such as a disk drive, it is necessary to test the device to ensure that it meets the required specification, for example, so called Back End Testing of the storage device. Also during manufacture of a storage device, it is necessary to write data to the disk, such data including servo bursts and the like. The present invention has application to testing storage devices during manufacturing and mounting of a storage device during a servo-writing process (when servo tracks are written to the storage device, including the case where a separate clock head is used as well as the self-servo writing (SSW) process and the self-servo fill (SSF) process).

To increase throughput and for reasons of cost efficiency, manufacturers of storage devices usually process large numbers of storage devices simultaneously. The processing of devices can be either synchronous or asynchronous. To this end, the test apparatus typically includes one or more racks having multiple test slots that receive storage devices for testing or servo-writing. NB as used herein, "test apparatus" includes apparatus for testing storage devices and apparatus for servo-writing without loss of generality. The storage devices are placed in carriers or trays which are inserted into the slots. These may be fully or partially removable from the slots to allow a storage device to be inserted into the slot for testing or removed when tested. Usually, this insertion and removal is automated and is carried out by a robotic arm or the like.

As is well known, vibrations arising in the apparatus can affect the operation of the storage device and it is therefore desirable to minimize the effect of such vibrations. This is particularly important during manufacture and testing of a disk drive as these processes are particularly susceptible to error. In the case of disk drives, vibrations mainly arise from rotation of the disk and/or the pivoting movement of the disk arm that carries the read/write head or heads. There is also often a fan present in the apparatus, which gives rise to its own vibrations. In addition, there may be other sources of vibration within the apparatus, including for example automation used for exchanging disk drive units in the apparatus, power supply units for supplying power to the apparatus, computing apparatus used for controlling operation of the apparatus, and pumps and water flow used for cooling the apparatus. Excess vibration can affect the reliability of test results and the integrity of electrical connections. Under test conditions, the drives themselves can propagate vibrations through supporting structures or fixtures to adjacent units. This vibration, known as "cross-talk," together with external sources of vibration, contributes to bump errors, head slap and non-repetitive run-out (NRRO), which may result in lower yields and increased manufacturing costs.

Furthermore, where the test slots are asynchronous, i.e. the tests or actions performed on an individual storage device are not necessarily the same as those performed on other storage devices within the apparatus, meaning that one device may be undergoing a process that is highly sensitive to vibration whilst a neighboring device is undergoing a process that generate a significant amount of vibration.

Accordingly there is the need to control vibration within the apparatus such that the amount of vibration transmitted from, or to, the storage devices is at an acceptable level. This need is likely to become even more acute in the future, as the trend is for the level of precision found in storage devices to increase as storage densities increase.

In some prior art test systems, it is known to effectively clamp the disk drive to a large mass in order to minimize the effect of vibrations. As is well known in general, the greater the mass, the lower the frequency of the rotational mode of the combination of the disk drive and carrier. Whilst in principle it is possible to increase the mass, this becomes very problematic when plural disk drives are being operated on in the same apparatus. For example, existing servo writing and/or testing apparatus may operate on several thousand or more disk drives simultaneously. Simply increasing the mass to which each disk drive is clamped can result in the apparatus having a very large mass overall, and also inevitably increases the cost of the equipment because of both the capital cost of the masses themselves and also the cost of the additional supporting arrangements that are needed to support such a heavy total mass.

Another approach is to stiffen the supporting structure that holds the slots/disk drives. For example, in one known system a matrix of welded sheet stainless steel is used which provides 'pigeon holes' for receiving a single disk drive per hole as a batch cells in an environmental chamber of sorts. Another known example uses a system of welded metal shelves to which allowed isolated systems are mounted.

The main problem with these approaches is that they require a substantial structure that is heavy, and low in density per volume. The structure can be made highly rigid, for example by using 50 mm steel box section in one known system. However, this becomes a problem when working at the densities that manufacturers demand from the test apparatus. There is a demand from manufacturers to achieve high density of storage devices in the test apparatus. This is required to help meet capacity targets and also for spreading system costs over a greater number of slots. For instance, the cost of the automation/robot is high, and so it is desirable that it service as many slots as possible to spread the cost. However, an apparatus with a high density of storage devices will be heavy which may become a problem because of floor loading criteria. If the combined apparatus is too heavy it cannot be used in some factories because it exceeds the allowable floor loading criteria, therefore cannot be purchased for the purpose.

A coupled problem is associated with serviceability. With a front serviced unit, since the disk drives are inserted from the front, the connection to the drive and the electronics are usually located behind the drive. Therefore in order to service the electronics (and other components such as fans, valves, stepper motors, heater coils etc.) the slots need to be removed to provide access. Where multiple slots are grouped together to share common electronics, then the supporting structure for the slots, also needs to be removed to allow the larger electronics to be removed.

To address these and other challenges, the recent trend is for test apparatus to use "cells" of multiple slots. FIG. 1 shows an example of a test apparatus as disclosed in our WO-A-2010/139989 and WO-A-2010/139973, the entire contents of which are hereby incorporated by reference. The apparatus comprises a frame of structural members 1 supporting "modules" 2, which consist of a sleeve or similar structure defining an aperture into which a cell can be received. An example of a cell 3 is shown separately in FIG. 1 comprising a cell front part 4 and a cell rear part 6. In this example, the cell front 4 comprises a housing defining a 3 by 4 matrix spaces into which slots 8 are fixed, typically by resilient mounts, to the walls of the housing. A tray 9 (sometimes called a disk drive carrier) can be withdrawn at the front of each slot to allow access to the storage device. The cell rear 6 contains controlling electronics and the environmental control system for the slots. The later may comprise fans, heaters, and heat exchangers to circulate a temperature controlled airflow through the slot to control the temperature of the disk drive during testing. The grouping of slots 8 into a cell 3 allows the electronics cost being spread across multiple slots in order to reduce the overall cost per slot of the system. The cell 3 is preferably removable from the module 2 due to the need to service the slots 4 or components behind the slots, or to allow the apparatus to be reconfigured to allow different types of testing or storage devices to be tested.

Other examples of cell based designs are disclosed in WO-A-2006/030185 and WO-A-2012/030481.

When designing multiple slot cells 3, considerable effort has been placed into making the cell structure as quiet/stiff as possible. However, due to the need to place disk drives in at one end of the cell 3, and have air entering and leaving the slot at the other, the cells 3 are effectively open ended meaning that the structure has little triangulation, which impairs the stiffness of the cell 3 structure. Typically the cells are then wedged into the sleeve on the module 2 and are packed with either compliant foam or similarly compliant damping materials. Whilst the module 2 attempts to stiffen the cell 3, the cell 3 is only as static as the stiffness of the module allows.

Another issue with using a gasket approach, i.e. cramming foam around the cell 3 to react to the module 2, to stiffen the cell 3 is that the stiffness of the supporting structure of the cell varies. Therefore there tends to be variation in performance for each slot 8 with the slots at the top and bottom being most rigid, whilst the slots in the middle inevitably being more mobile.

FIGS. 2A and 2B illustrate this point by reference to a cell having a 1×8 arrangement of slots. FIG. 2A shows the cell without a gasket. The stiffness of the sidewalls of the cell varies, such that the first mode of vibration of the side wall is as shown in FIG. 2A. As can be seen, slots 4 and 5 have higher freedom to move than the more restrained slots 1 and 8. This tends to produce crosstalk between slots. FIG. 2B shows the affects of force applied to the module from the cell, and the deformation of the module walls as a result of the force where a compression gasket is used to hold the slots in position. This causes a static deflection of the side walls of the cell causing the slots at the top and bottom to be held tighter than the slots in the middle. This can cause the entire system to "bulge" in a barrel shape.

What is needed is a way of supporting a disk drive in a test apparatus that addresses these various problems.

According to a first aspect of the present invention, there is provided an apparatus for supporting storage devices during manufacturing, the apparatus comprising: structural members; plural slot carriers received in bays in the apparatus, each slot carrier carrying at least one slot arranged to receive a storage device, wherein the slot carriers are insertable and/or removable from the bays through apertures at the front of the apparatus; and, clamp assemblies arranged to releasably clamp the slot carrier to one or more structural members at the sides of the slot carrier.

This arrangement provides a way of stiffening the structure with each additional slot inserted into the test apparatus. At the same time, this arrangement allows the slots and their carriers to be easily removed for maintenance or reconfiguration, or accessing components behind the slots. This allows the structural members be made lighter and thinner than in prior art apparatus allowing increased densities of storage devices without sacrificing stiffness. This is in contrast to cell based prior art, as rather than use the module structure to support the cell as in the prior art, the invention uses the addition of each slot to the apparatus to provide an increase in stiffness to the module.

The slot carrier can be made rigid enough to provide the desired level of stiffness to the structure. There is preferably isolation or dampers between the slot carrier and the slot itself to prevent vibration entering the slot from the structure or exiting the slot to the structure.

The clamp assembly can be fixed to or formed with the slot carrier, with the structural members or separate from both. There are potentially many ways of implementing a clamp assembly to provide such clamping. For example, the clamp assembly could comprise an expanding element that can be made to expand inside a cavity fixed with the slot carrier or structural member to clamp against opposed surfaces of cavity. Alternatively, the clamp assembly could clamp around part of the slot carrier or structural member, or an element fixed to the slot carrier or structural member.

Preferably the bays are arranged in plural columns or plural rows. In an embodiment, the structural elements may be vertically arranged between the columns, and adjacent columns may share a structural element for support and stiffness. The structural elements may be joined together in a framework by other cross elements. The framework of structural elements may be mounted to the floor via other isolators, or similar.

Preferably the clamp assembly comprises an actuator by which the clamp assembly is made to clamp the slot carrier to the structural members, wherein the actuator is accessible from the front of the apparatus. This provides easy access to operate the clamp assemblies to clamp or release a slot carrier, allowing slots to be swapped in or out of the apparatus.

Preferably the apparatus comprises a rail at each side of the slot carrier such that the slot carrier can be slidably inserted and/or removed from the bay on the rails. This provides a convenient way of locating the slot and slot carrier in a bay in the apparatus.

Preferably each rail is either: i) fixed to or formed with at least one structural member, wherein the slot carrier provides a channel at the side for receiving the rail, or ii) fixed to or formed with the slot carrier, wherein at least one structural member or a member fixed thereto provides a channel at the side for receiving the rail.

The rails can be formed from or attached to the structural members at the sides of the slot, or alternatively they can be formed from or attached to the slot carrier. The rail and/or channel can made be part of the clamping arrangement. For example, the clamping mechanism can be made to clamp the rail, or the rail can incorporate the clamping mechanism.

Preferably the clamping mechanism is provided by at least one of said rails being an expandable rail assembly, wherein the expandable rail assembly is operably expandable to clamp opposed surfaces of the channel in which the expandable rail assembly is received.

Preferably the expandable rail assembly comprises a fixed rail and a slider, wherein the slider has at least one ramp arranged to slide on a ramp of the fixed rail, wherein the expandable rail assembly is made to expand by movement of the slider relative to the fixed rail along the axis of the rail assembly such that the ramp of the slider rides up the ramp of the fixed member.

This provides a convenient way of clamping the slot carriers to the structure such that they stiffen the structure. The rails also help guide the slot carriers into the bays in the apparatus. In a preferred embodiment, the slider has two or more ramps. The plural ramps may be provided by respective plural slider elements that can move independently of each other under the control of the actuator.

Preferably the expandable rail assembly comprises a threaded shaft received in a threaded hole in the slider, such that rotation of the shaft causes movement of the slider relative to the fixed rail along the axis of the rail assembly. The shaft can be connected to the actuator which is accessible at the front of the apparatus, so that an operator can rotate the shaft via the actuator and make the rail assembly expand. Where plural slider elements are used, the shaft may have differently handed threaded portion for two slider elements, or the actuator may butt against part of one slider element, such that rotation of the shaft causes the slider elements to move in opposite directions, i.e. closer together or further apart. In this case, the ramps on the slider elements and fixed rail member for the two slider elements will have opposite orientations so the slider elements ride up the ramps together. The rail assembly may have back stops which limit the movement of the slider elements as they move down the ramps.

Preferably in a front projection, at one or each side of the slot carrier, the clamp assembly is arranged to clamp the slot carrier to the structural members at two clamping points separated by a distance d.

Preferably d is at least 25% of the height of the slot, and more preferably d is at least 50% of the height of the slot. By achieving a significant separation of the two clamping points, the connecting is triangulated and thus stiffened against rotational modes of vibration.

Preferably one or more clamping points on the clamp assembly has an inclined surface for mating with an inclined surface on the surface being clamped. This can help locate and fix in place the slot carrier to the rail assembly when the rail assembly is expanded. They also help the clamp connection resist lateral forces.

In an embodiment one or more clamping points of the clamp assembly have a generally V-shape groove or protrusion for mating with a protrusion or groove respectively on the surface being clamped. These V-shape protrusions fit into the V-shape grooves and help locate and fix in place the slot carrier to the rail assembly when the rail assembly is expanded. They also help the clamp connection resist lateral forces.

In an embodiment one or more clamping points of the rail assembly has a plurality of adjacent V-shape grooves or protrusions in order to provide incremental clamping on the surface being clamped.

This allows the clamping to accommodate tolerance differences between the structures. So in other words providing lots of relatively small Vs means they will key into each other, and will only distort the structure by a maximum of the pitch of the V. Preferably the V-shape groove or grooves and projection or projections are aligned with the direction in which the carrier is inserted into the bay, i.e. front to back in the preferred embodiment.

Preferably the slot carrier has a body portion extending between the structural members, wherein in a front projection, the axis of the body of the slot carrier is generally aligned with a clamping point at one or each side of the slot carrier. This means that the main compressive and/or tensile force runs through the axis of the planar body of the slot carrier, i.e. where the bulk of its material is located, where it has the most strength and the least shear force. Thus, this arrangement provides the greatest stiffness to the structure.

Preferably the slot carrier has a body portion extending between the structural members, wherein in a front projection, the axis of the body of the slot carrier passes between the two clamping points at one or each side of the carrier. This provides resistance to tensile or compressive forces bending the slot carrier by balancing the reaction forces from the clamping points either side of the axis of the body of the carrier. This is in contrast to an arrangement such as shown by FIG. 9B, where the attachment point is above the body of the material causing the material to bend.

Preferably in a front projection, said separation of clamping points is in a direction that is generally aligned with the direction of the structural members. Preferably the direction in which the rail assembly expands is generally parallel (or largely parallel to say within 20 degrees) to the axis of the body portion of the carrier. This means that the rail assemblies can be kept fairly flush to the supports, leaving the maximum amount of room for the slots between the rail assemblies.

Preferably the apparatus comprises control circuitry for testing a said storage device or servo-writing to a said storage device in the slot. In an embodiment, the control circuitry is situated to the rear of the slots. In an embodiment, plural slots share a common control circuit board.

According to a second aspect of the present invention, there is provided: a method of supporting storage devices in an apparatus during manufacturing, the apparatus comprising: structural members; plural slot carriers received in bays in the apparatus, each slot carrier carrying at least one slot arranged to receive a storage device; and, clamp assemblies arranged to releasably clamp the slot carrier to one or more structural members at the sides of the slot carrier, the method comprising: inserting a slot carrier into the apparatus through an aperture at the front of the apparatus; and, clamping the slot carrier in the bay with the clamping assemblies.

The method may comprise testing a said storage device or servo-writing to the storage device.

The method may comprise unclamping the slot carrier from the bay with the clamp assemblies; and, removing the slot carrier from the bay through the aperture. In this way, new slots can be swapped in for old slots, allowing maintenance or reconfiguration of the machine for different testing or processing of the storage devices, or different types of storage devices.

Embodiments of the present invention will now be described by way of example with reference to the accompanying drawings, in which:

FIG. 2A show the affects of vibration on a cell of test slots in an prior art apparatus;

FIG. 2B shows the affects of force applied to the module from the cell, and the deformation of the module walls as a result of the force in a prior art apparatus

FIGS. 10A and 10B show another example of a test apparatus according to an embodiment of the present invention;

Figure 16:
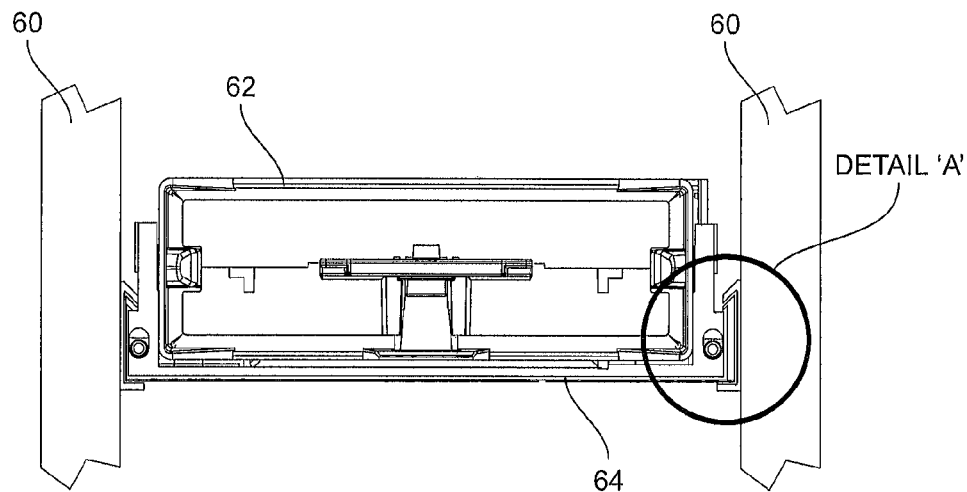
Figure 16A:
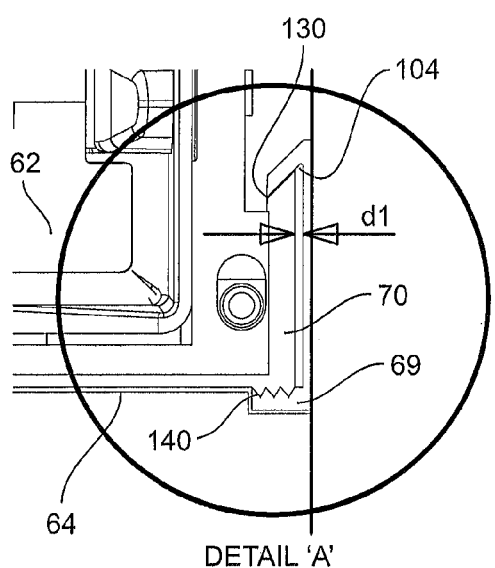
Figure 16B:
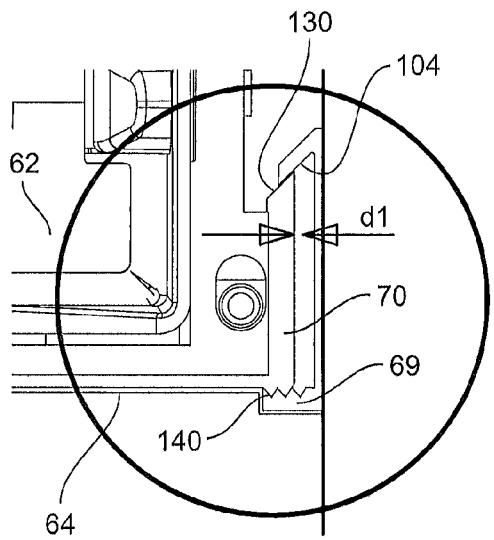

FIG. 16 and the detail view of FIGS. 16A and 16B show an example of the clamping surfaces between the rail assembly and the channel according to an embodiment.

Figure 1:
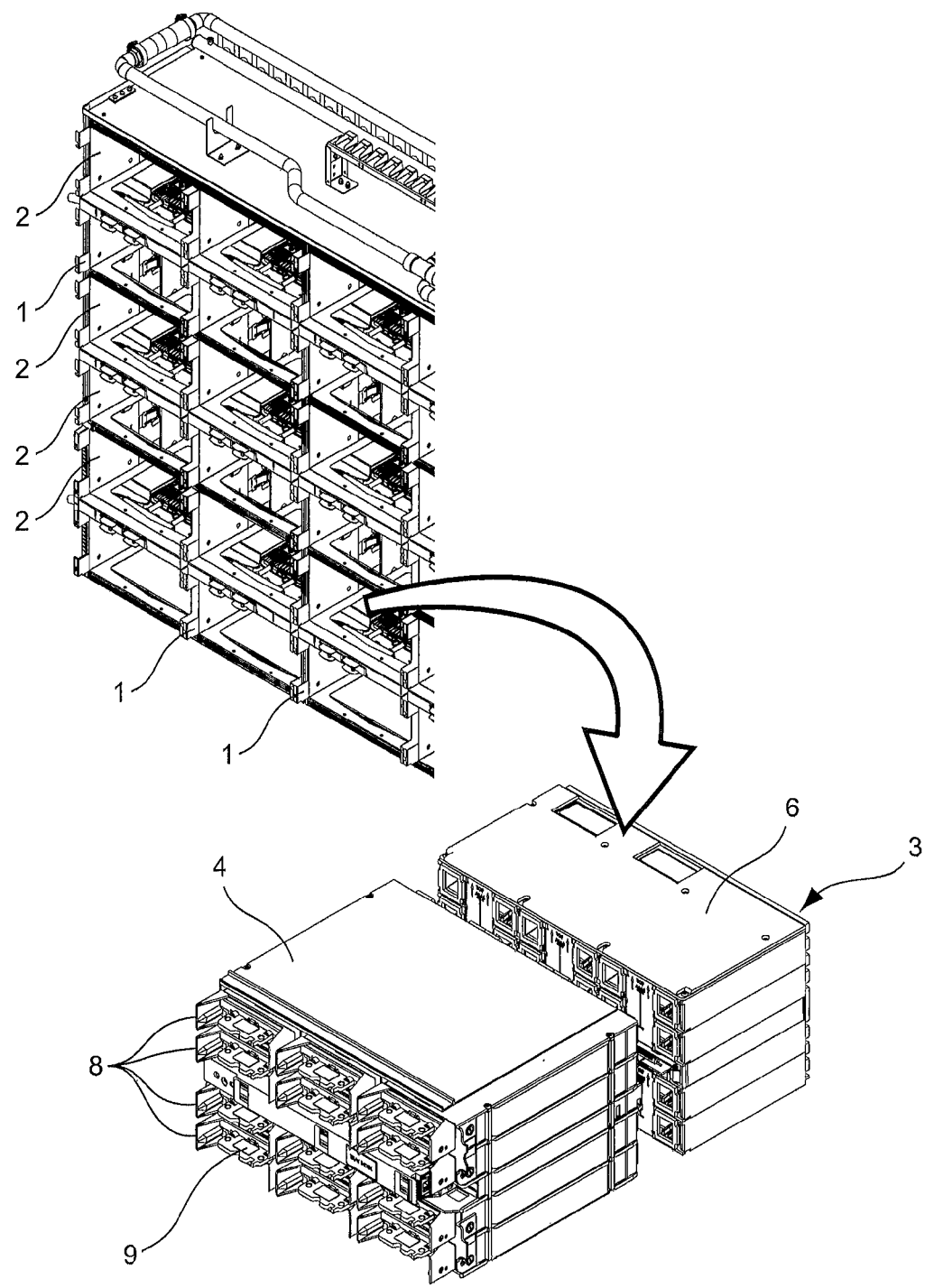
FIG. 1 shows a prior art test apparatus.
Figure 3:
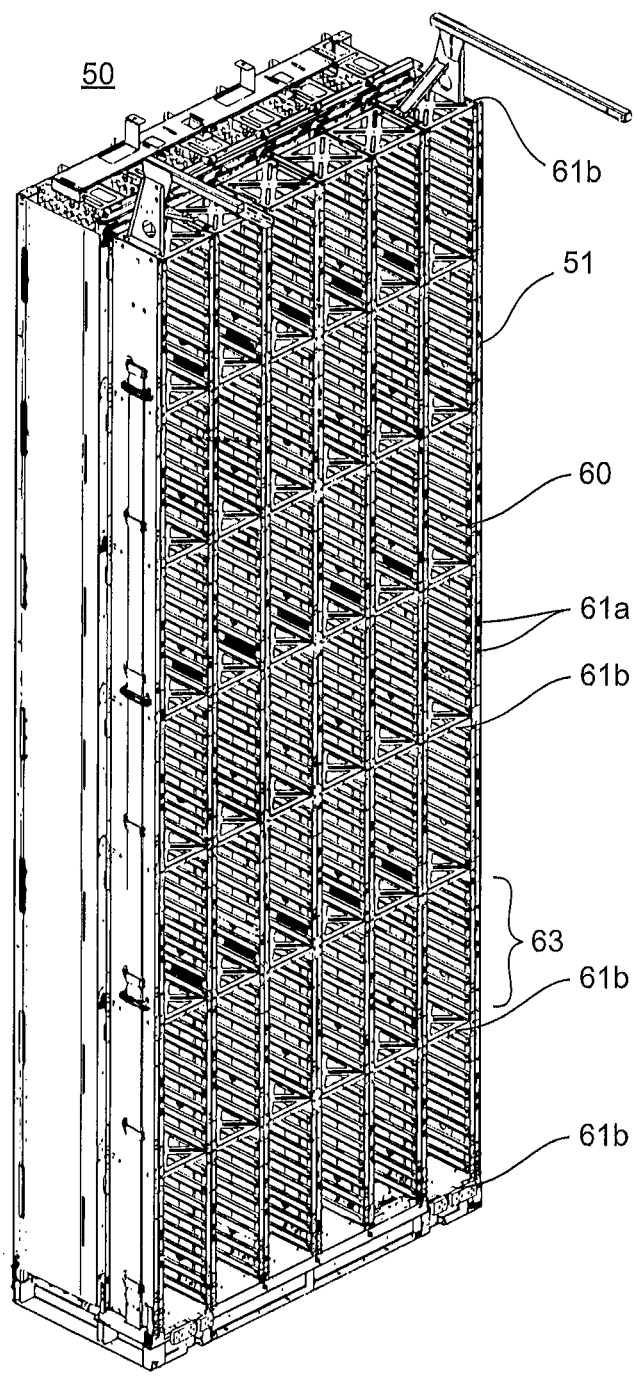
FIG. 3 shows an example of a chassis according to an embodiment of the present invention.
Figure 3A:
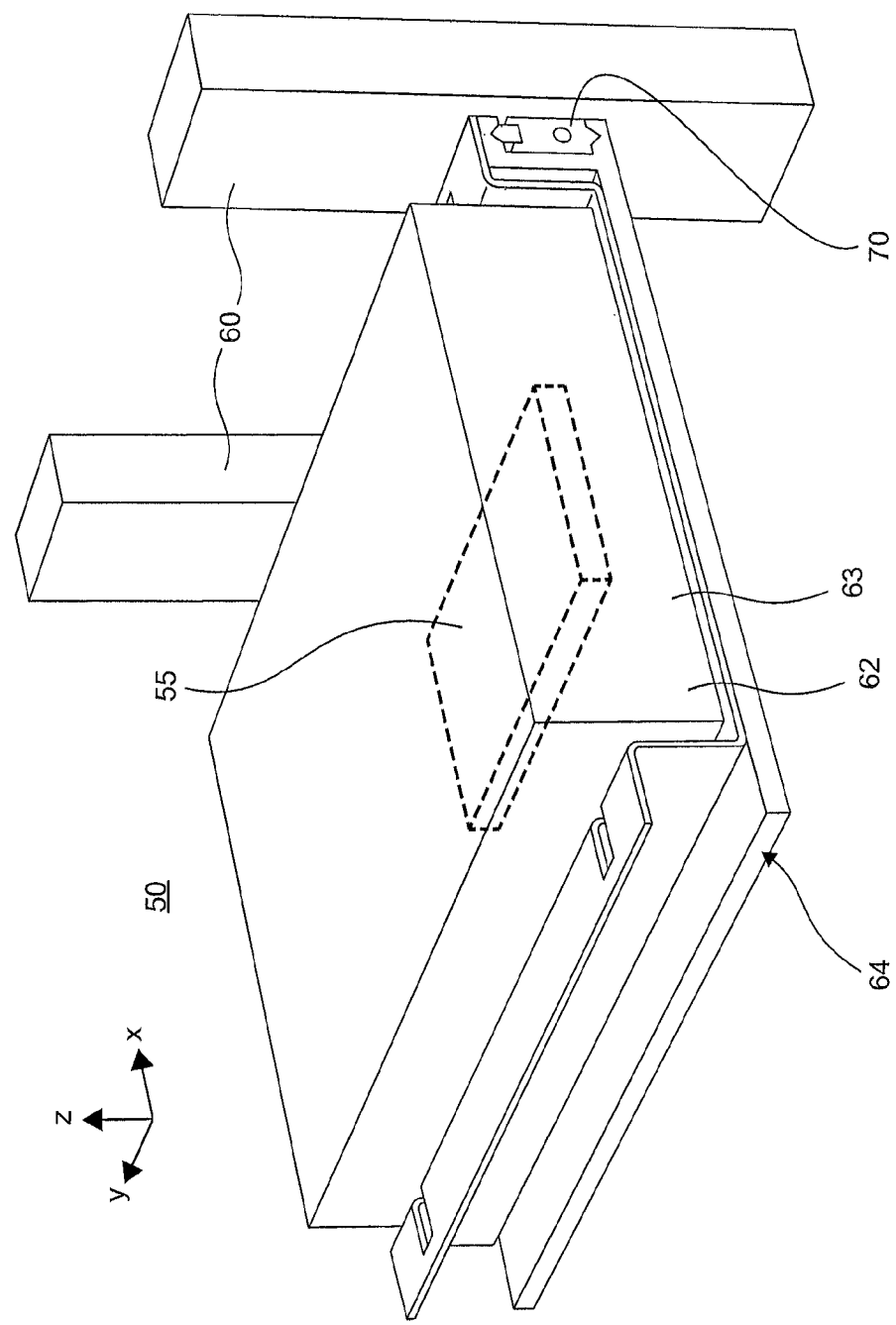
FIG. 3A shows a detail view of FIG. 3 showing a slot carrier and slot within the chassis.

FIGS. 3 and 3A shows a test apparatus 50 according to an embodiment of the present invention. The apparatus 50 can be used for testing storage devices during manufacture, servo-writing to storage devices, or indeed any process carried out on storage devices during manufacture where plural storage devices are processed simultaneously in an apparatus.

The apparatus 50 has one or more module chassis or frames 51 comprising a plurality of structural members 60. The structural members 60 are rigid structural members (e.g., formed sheet metal, extruded aluminium, steel tubing, and/or composite members). In this example, the structural members 60 include vertical structural members 60a spaced across the width of the apparatus 50 towards the front and the back of the apparatus 50 and spaced horizontal structural member 60b. The vertical and horizontal members create a matrix of apertures for cells. Each module chassis of the apparatus 50 has a plurality of test slots 62 (shown in FIG. 3A, but not shown in FIG. 3 for clarity), which in preferred embodiments may be 300 slots or more (depending on the height of the apparatus). Each test slot 62, or optionally plural test slots 62 arranged in a cell, is mounted to a slot carrier 64. The apparatus has a plurality of bays 63 which can receive slot carriers 64. An expanding rail assembly 70 is provided at each side of the slot carrier 64 to attach the slot carrier 64 to the structural members 60 in the aperture.

It should be noted that in the following, as is conventional in the art, references to the front, rear, top, bottom, sides, etc. relate to the rack as depicted in FIG. 3. Nonetheless, other orientations are possible and the present invention is not limited to the particular orientation shown. These references should be construed accordingly.

FIG. 3A shows a detail view of a test slot 62 attached to structure 60. Storage devices 55 (shown in transparent view in FIG. 3A) are disposed in the test slots 62. A storage device, as used herein, includes disk drives, solid state drives, memory devices, and any device that benefits from high volume, high through-put testing or configuration during the manufacturing process.

Figure 3B:
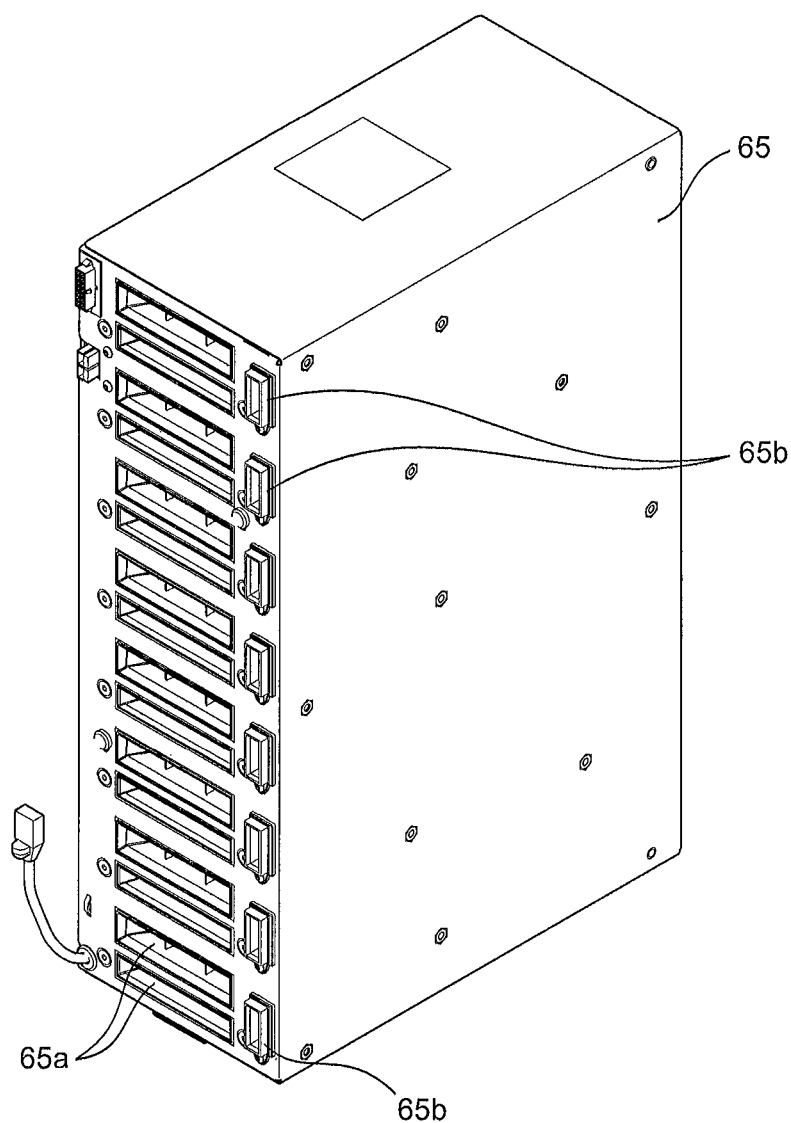
FIG. 3B shows a view of a cell rear section.

The test slots or cells of test slots 62 may in principle be of any suitable construction, and are not described in detail herein. Nonetheless, in short, a slot 62 will typically have a tray or carrier at the front for receiving the storage device, which can be fully or partially withdrawn to allow access for inserting/removing the storage device. Electronics for controlling the testing of the storage device or writing servo tracks to the storage device will normally be located behind the slots 62. Also, systems for controlling the environment of the storage device during testing, such as heaters, fans, heat exchangers, etc, will normally be located behind the slots 62. The electronics and environment control system may be shared between plural slots 62. The slots 62 and their carrier 64 provide an isolation system for the storage devices. FIG. 3B shows an example of the rear of a cell 65 which provides environmental control and electronic control to plural slots 62 by way of apertures 65a for air flow and electrical connectors 65b. The cell rear 65 is inserted into the module first and then the slots 62 are inserted and dock to the cell rear 65.

A robot or automation (not shown) controlled by a controller may be provided to move the tray into the slot 62 and exchange storage devices. The apparatus 50 may also have a load/unload station (not shown) where the automation can deposit tested storage devices and pick up new storage devices that are to be tested.

Figure 4:
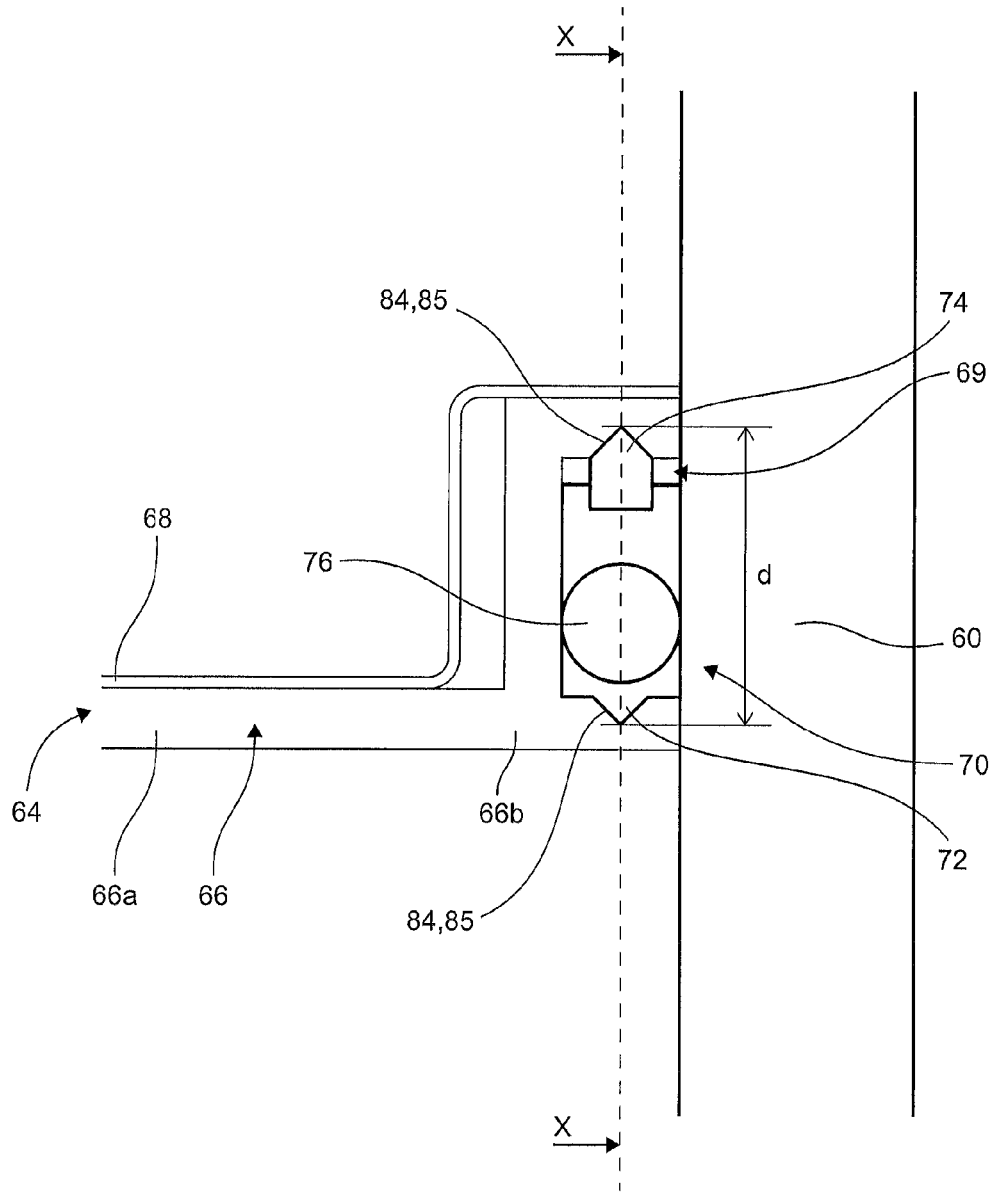
FIG. 4 shows a detail view of the slot carrier and rail assembly of FIGS. 3 and 3A.

Referring now to FIG. 4, the slot carrier 64 comprises a fixing member 66 and a liner 68 fixed on the fixing member 66. The fixing member 66 attaches to the rail assemblies 70 at both sides. The fixing member 66 has a generally planar portion 66a which provides a platform for supporting the slot 62, and side portions 66b, which are thicker than the planar portion 66a. The fixing member 66 is constructed and arranged to be stiff, yet preferably light and having a small footprint. For example, it can be made from aluminium or plastics. The liner 68 is thin relative to the fixing member 66 and may for example be made from plastic. The slot 62 is preferably mounted to the liner 68 via isolators or dampers (not shown) to control vibration entering or exiting the slot 62. A flex circuit (not shown) carrying data and power signal from the storage device 55 runs from the back of the slot 62 to the control electronics at the rear of the test apparatus 50.

Each side portion 66b of the fixing member 66 defines a channel 69 which runs longitudinally along the sides of the slot carrier 64 from the front to the back and which is open at the front and back and to the side. The slot carrier 64 can be slid onto the rail assemblies 70 from the front such that the channels 69 receive the rail assemblies 70.

Figure 5:
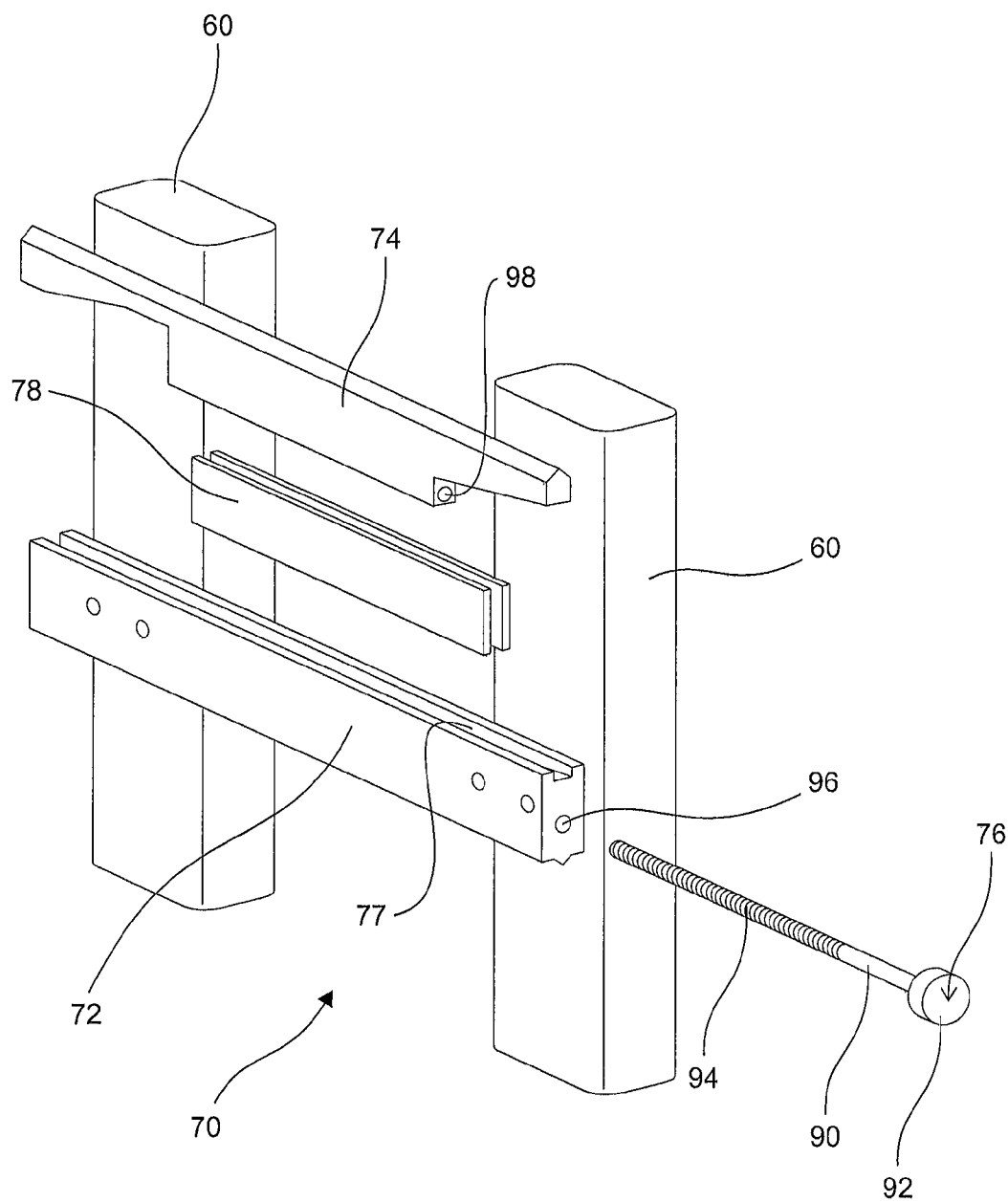
FIG. 5 shows an exploded view of the rail assembly.
Figure 6:
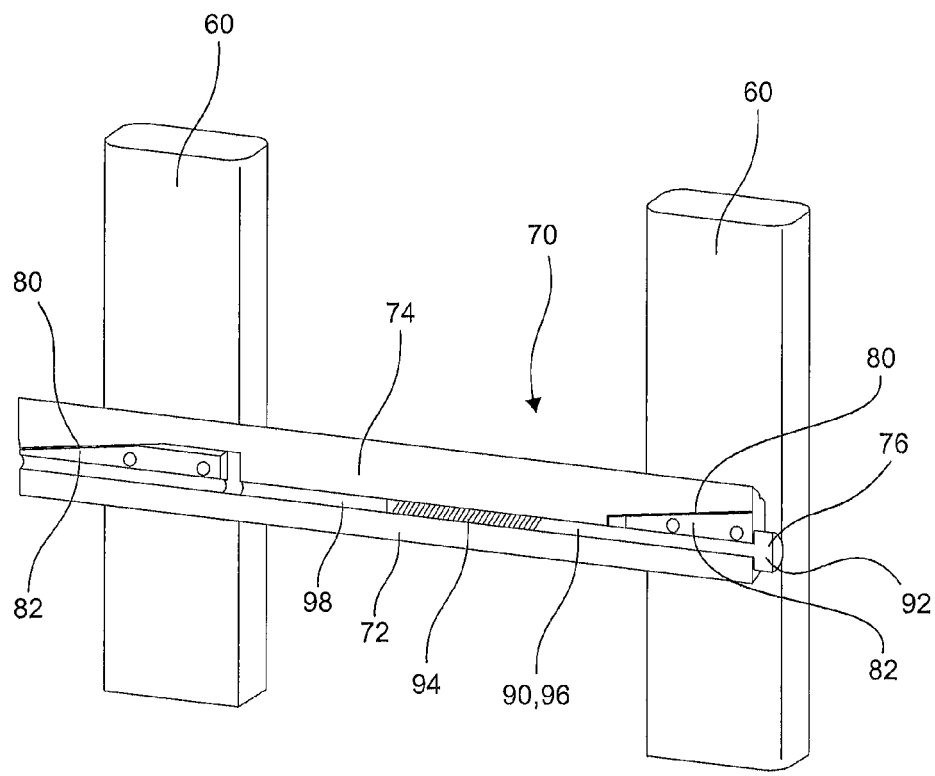
FIG. 6 shows a cross section view of the rail assembly taken through plane X-X shown in FIG. 4.

FIG. 5 shows an exploded view of the rail assembly 70 and FIG. 6 shows a cross section view of the rail assembly 70 taken through plane X-X shown in FIG. 4. The rail assembly 70 comprises a fixed rail member 72, which is fixed to the structural members 60 and a slider 74, which is arranged to be slidable against the fixed rail member 72 in a forwards and rearwards direction. The rail assembly 70 also has an actuator 76 which is operable to make the slider 74 slide relative to the fixed rail member 72.

As can be seen most clearly from FIG. 5, the fixed rail member 72 includes a longitudinal channel 77 in which the slider 74 is disposed. Strips 78 of cushioning or damping material, e.g. SAX foam, may be placed between the sides of slider 74 and the side walls of the channel 77 to prevent "chattering" of the parts of the rail assembly 70.

As can be seen most clearly from FIG. 6, the channel 77 has one or more ramps 80, two in this example, along its length which contact corresponding ramps 82 along the slider 74. Thus, as the slider 74 slides forwards and rearwards on the fixed rail member 72, the ramps 80, 82 provide a camming action that raises and lowers the slider 74 relative to the fixed rail member 72. In this way, the rail assembly 70 can be made to expand until it clamps against the opposing surfaces of the channel 69.

The clamping surfaces of the channels 69 have V-shape grooves 84 running along their length. The clamping surfaces of the rail assemblies 70, i.e. the fixed rail member 72 and the slider 74, have corresponding V-shape protrusions 85. These V-shape protrusions 85 fit into the V-shape grooves 84 and help locate and fix in place the slot carrier 64 to the rail assembly 70 when the rail assembly 70 is expanded.

The actuator 76 comprises a shaft 90 and an engageable portion 92. The engageable portion 92 is accessible at the front of the slot carrier 64 for the user or automation to engage with and operate the actuator 76. This may be for example a knurled knob for manual operation, or a keyed part for engagement with a tool.

The shaft 90 has a threaded portion 94 and passes through a hole 96 in the front of the fixed rail member 72 and through a hole 98 in the slider 74. The hole 74 in the slider 74 has a threaded portion 98 that engages with the threaded portion 94 of the shaft 90, such that rotation of the actuator 76 causes the slider 74 to be drawn forwards and backwards relative to the fixed rail member 72.

Thus, a slot 62 and slot carrier 64 can be added to the test apparatus 50 by inserting the slot carrier 64 into a vacant aperture in the front of the apparatus 50 such that the channels 69 in the slot carrier 64 receive the rail assemblies 70. Once the slot carrier 64 is fully inserted, the rail actuators 76 are rotated to expand the rail assemblies 70 at both sides, which has the effect of clamping the slot carrier 64 and slot 62 in position in the apparatus 50. The process is followed in reverse to remove the slot carrier 64 and slot 62 by rotation the actuator 76 in the opposite direction so that the rail assembly 70 unclamps the slot carrier 64, allowing the slot carrier 64 to be withdrawn from the apparatus 50.

This allows a slot 62 to be removed for maintenance or to access the electronics or other components behind the slots 62 at the rear of the apparatus 50. Different arrangements of slots or cells of slots 62 can be inserted into the apparatus 50. Each test slot carrier 64 can support a plurality of test slots. Different ones of the test slot carriers can be configured for performing different types of tests and/or for testing different types of storage devices. The test slot carriers are also interchangeable with each other within among the many carrier receptacles within the testing system allowing for modification and/or customization of the testing system as required by the manufacturer. For example 3.5 inch disk drives and 2.5 inch disk drives may be tested in different slots. The rail actuators 76 are accessible from the front of the apparatus, making access simple for the operator. Thus the apparatus 50 can be easily reconfigured by an operator.

The arrangement of the slot carrier 64 and rail assembly 70 also acts to stiffen the entire apparatus 50. As each slot carrier 64 is added, the vertical structural members 60 receive further bracing from the slot carrier 64. As can be seen from FIG. 7, the bottommost point of contact 90A between the slot carrier 64 and rail assembly (i.e. the V protrusion 84 of the fixed rail member in its V channel 85) is aligned with the planar part 66a of the slot carrier 64. This means that the main compressive and/or tensile force 94 runs through the axis of the planar part of the slot carrier 64, i.e. where the bulk of its material is located, where it has the most strength and the least shear force. Thus, this arrangement provides the greatest stiffness to the structural members 60.

The topmost point of contact 92A between the slot carrier 64 and rail assembly (i.e. the V protrusion 84 of the slider 74 in its V channel 85) means that on each side of the slot carrier 64 there are two points of attachment 90A, 92A to the rail assembly 70 (i.e. the top and bottom V's), which are separated from each other by a distance "d" (shown in FIG. 4). This allows the slot carrier 64 to provide triangulation and stiffens the structure against rotation about the Y axis. Preferably, the points of attachment are separated in a direction that is generally parallel (or largely parallel to say within 20 degrees) to the y-axis (i.e. the orientation of the structural members 60). Thus, preferably the direction in which the rail assembly 70 expands is generally parallel (or largely parallel to say within 20 degrees) to the planar portion 66a of the carrier 66. This means that the rail assemblies 70 can be kept fairly flush to the structural members, leaving the maximum amount of room for the slots between the rail assemblies 70.

Figure 7:
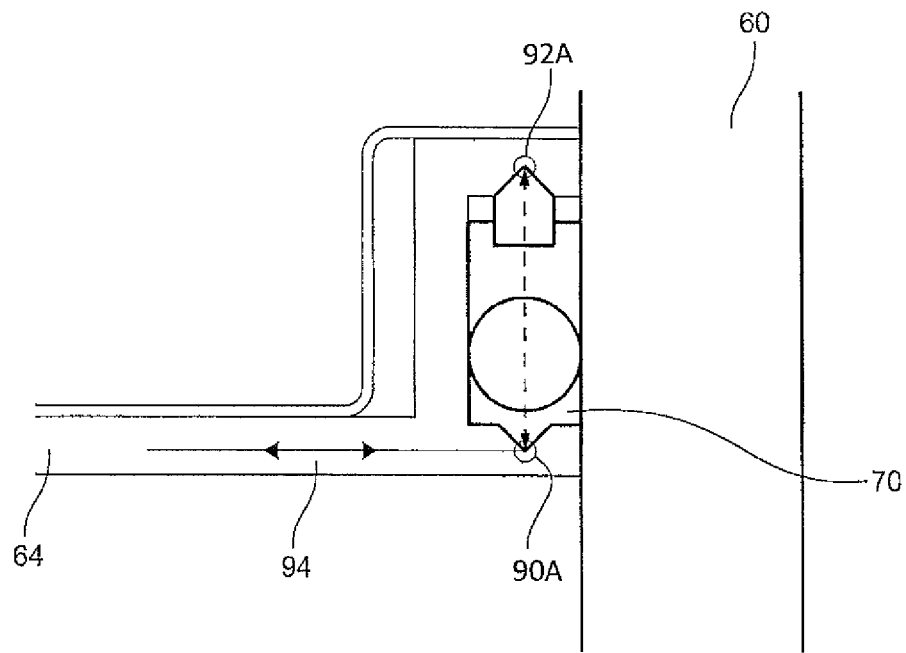
FIG. 7 shows the forces acting on the slot carrier of FIG. 3.
Figure 8:
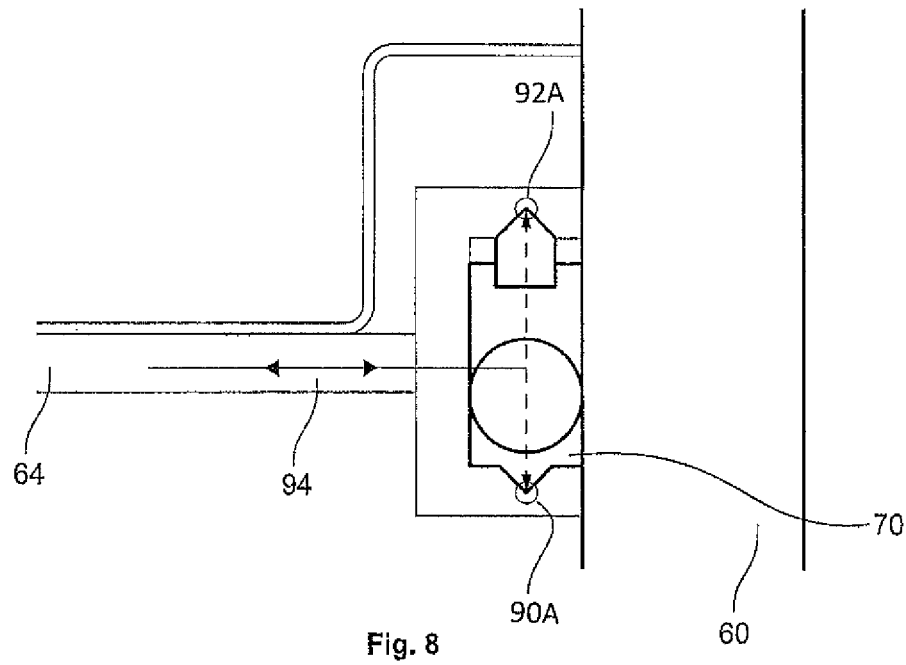
FIG. 8 shows the forces acting on an alternative example of a slot carrier.

As shown by FIG. 8, if desired the axis of the planar part 66a of the slot carrier 64 could be offset in between the points of attachment 90,92. This again provides stiffness to the structure and the offset of the points of attachment allow the structure to be stiffened against Ry rotation. However, the best results are obtained when the axis of the planar part 66a coincides closely with a point of attachment to the rail assembly as shown in FIG. 7.

Figure 9A:
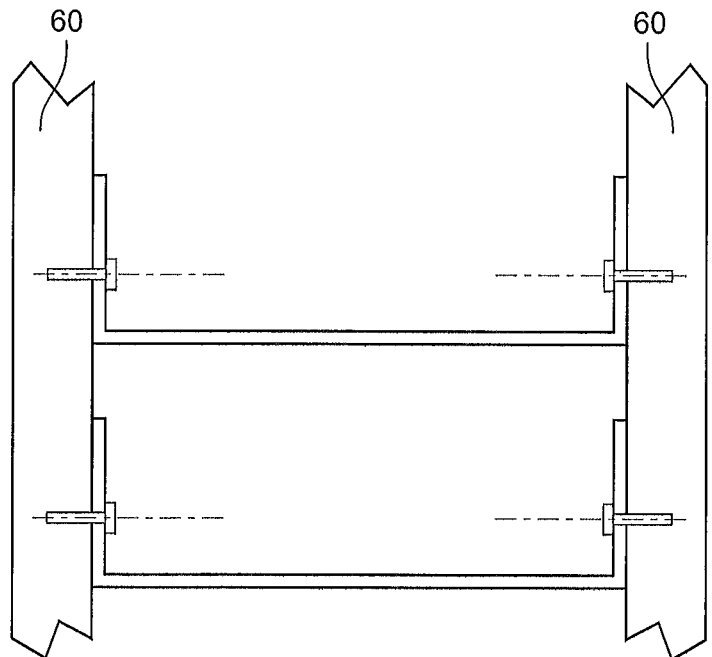
FIGS. 9A and 9B show the conventional mounting of a shelf between structural members.
Figure 9B:
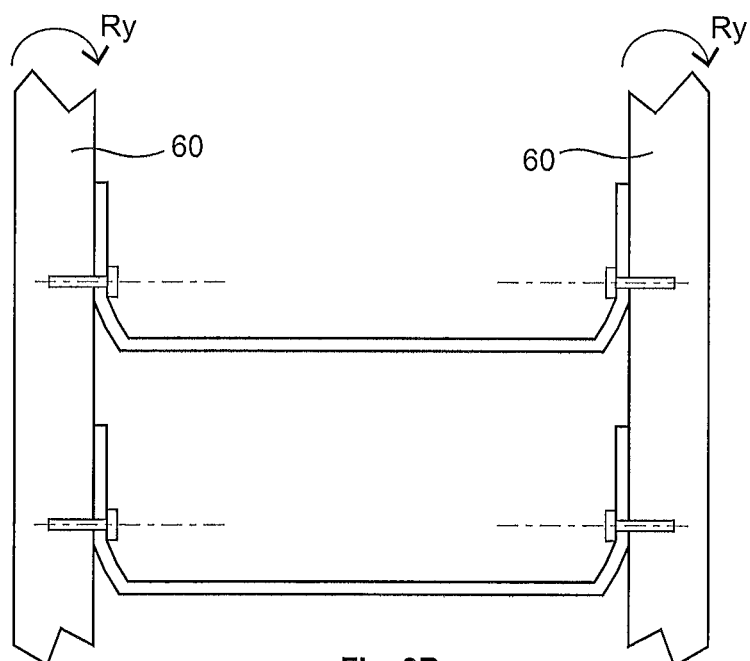

This is in contrast with other, more basic ways of attaching a shelf between two members. For example, one way would be to use fasteners (bolts, rivets, etc.) to attach into the sides of the carrier as shown in FIG. 9A. This has the problem in the first place of gaining access to the sides of the carrier to access the fasteners when it is desired to change the slot. Also this arrangement is not stiff, since the points of attachment are not aligned with the main part of the material between the structural members. The carrier therefore tends to "open out" as seen in FIG. 9B. Furthermore, this arrangement does little to brace the structural members against Ry rotation and so storage devices mounted to the structure have a large vibration mode in the Ry direction.

Thus, the preferred embodiments provide a way of stiffening the structure 60 with each additional slot 62 inserted into the test apparatus 50, whilst allowing the slots 62 to be easily removed for maintenance or reconfiguration. This allows the structural members 60 be made lighter and thinner than in prior art apparatus allowing increased densities of storage devices 55 without sacrificing stiffness.

It is contemplated that other arrangements can be used to clamp the slot carrier 64 to the vertical structural members 60 following the principles disclosed herein. For example, the rail assembly 70 could be attached to the slot carrier 64, and the channel 69 provided by members fixed to the vertical structural members 60. Other mechanisms for actuation can be used to move the slider 74 relative to the fixed rail member 72. Other mechanisms other than camming the slider 74 relative to the fixed rail member 72 can be used to expand the rail assembly 70.

Furthermore, other arrangements can be used for the structural members 60. For example, a single structural member 60 may be provided at each side. In the example of FIGS. 10A and 10B, which shows a lateral cross sectional view through the structural member 60 and rail assembly 70, with the slot present in FIG. 10A and omitted in FIG. 10B, the structural member 60 has an elongate C-shape in which the member 60 is formed from a relatively thin sheet of material which is bent back on itself at the ends, to which ends the rail assemblies 70 are attached by fasteners 71 at the front and rear. The space 63 between the ends of the structural member 60 can be used to house electronics or other components.

Figure 11:
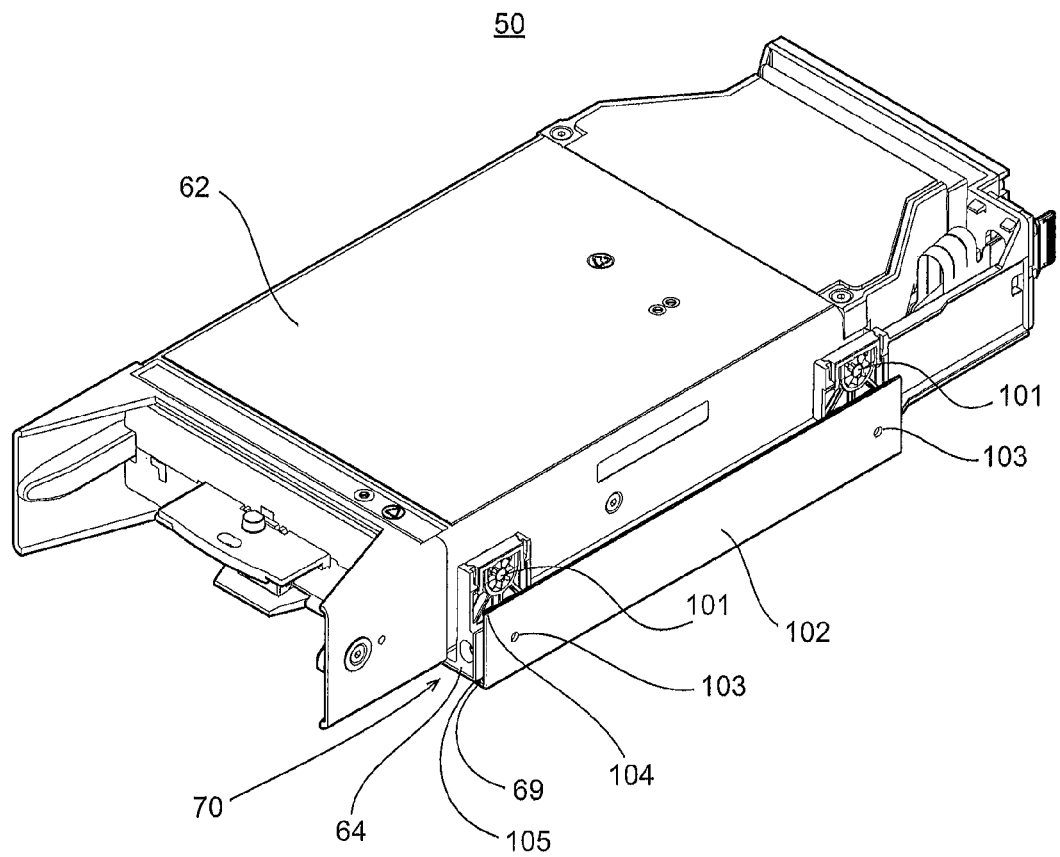
FIG. 11 shows a projection of another example of an apparatus according to an embodiment of the present invention shown from the front, the side and the top.
Figure 12:
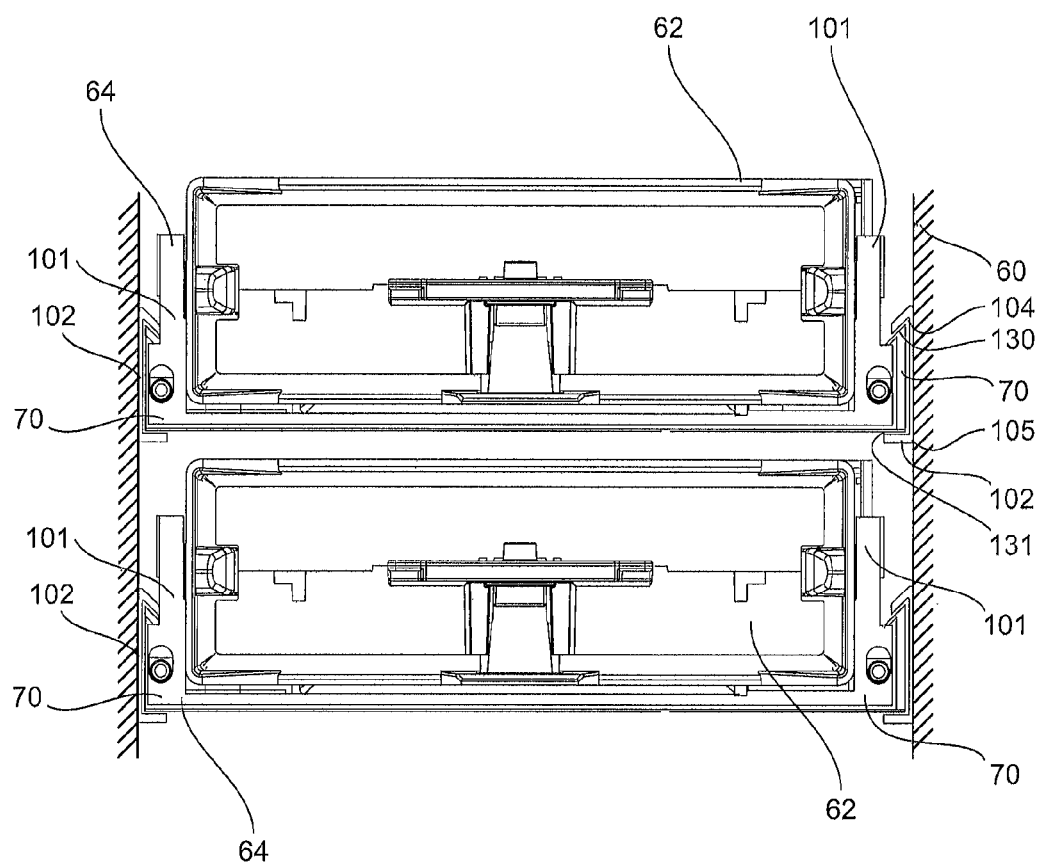
FIG. 12 shows the apparatus from the front.

FIGS. 11 and 12 shows another example of an apparatus 50 according to an embodiment of the present invention showing a slot 62 being mounted to structure 60 which generally operates on the same principles as the example of FIGS. 4 to 8, except for the following differences. In the example of FIG. 11, the slot 62 is attached to the slot carrier 64 via isolators 101 which help damp vibration to/from the disk drives in the slot 62. In this example, the rail assembly 70 is attached to and/or formed with the slot carrier 64 at each side. The structure (shown in FIG. 12) has a member 102 fixed thereto at each side by fixing elements (e.g. threaded fasteners or rivets through holes 103). The member 72 has the channel 69 which receives the rails assemblies 70 of the slot carrier 64. The rail assemblies 70 are expandable to clamp the surfaces of the channel 69. In this example, the top clamping surface 104 of the channel 69 is slanted inwards, whilst the bottom clamping surface 105 of the channel 69 is not slanted.

Figure 13:
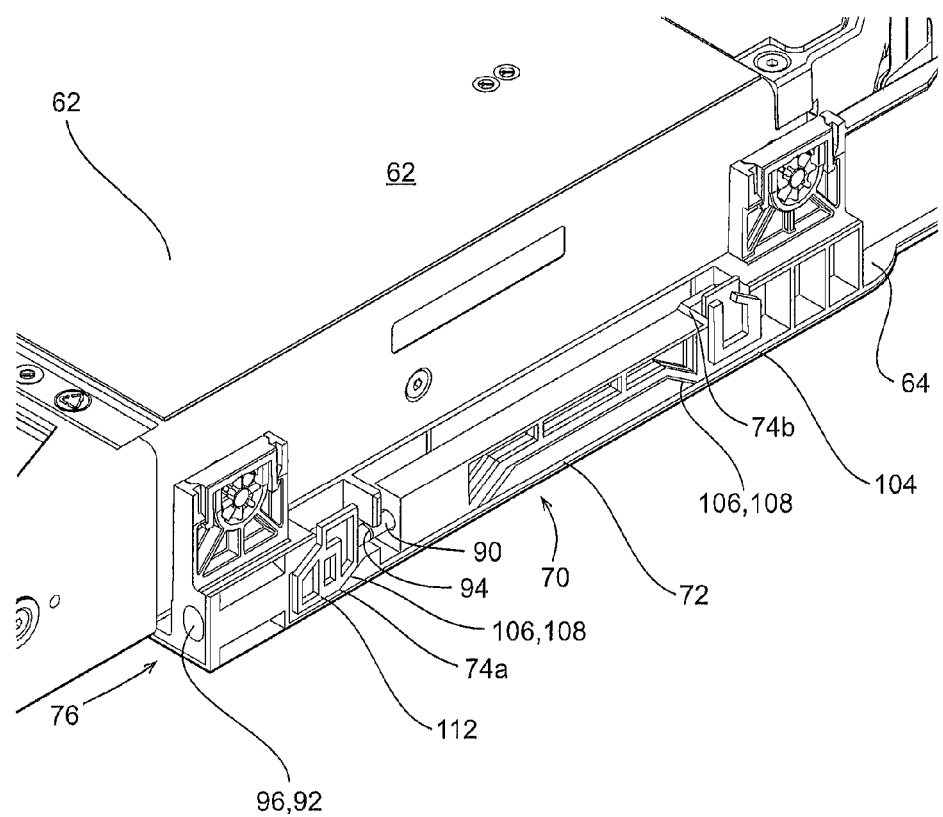
FIG. 13 shows a detail view of FIG. 11.

FIG. 13 shows a detail view of the rail assembly 70 comprising a fixed member 72 and two sliders 74a, 74b, with the channel member 69 and structure 60 not shown for clarity. The fixed member 72 of the rail assembly 70 is fixed to or formed with the slot carrier 64 and has two ramps 106 facing in opposite directions. The rail assembly 70 has two sliders 74a, 74b arranged to be slidable against the fixed rail member 72 in a forwards and rearwards direction. The sliders 74a, 74b have ramps 108 which correspond to the ramps 106 on the fixed member 72. The rail assembly 70 also has an actuator 76 which is operable to make the sliders 74a, 74b slide relative to the fixed rail member 72.

Thus, as the slider 74 slides forwards and rearwards on the fixed rail member 72, the ramps 80,82 provide a camming action that raises and lowers the sliders relative to the fixed rail member 72. In this way, the rail assembly 70 can be made to expand until it clamps against the opposing surfaces of the channel 69.

The actuator 76 comprises a shaft 90 and an engageable portion 92. The engageable portion 92 is accessible at the front of the slot carrier 64 for the user or automation to engage with and operate the actuator 76. This may be for example a knurled knob for manual operation, or a keyed part for engagement with a tool accessible through hole 92.

Figure 14:
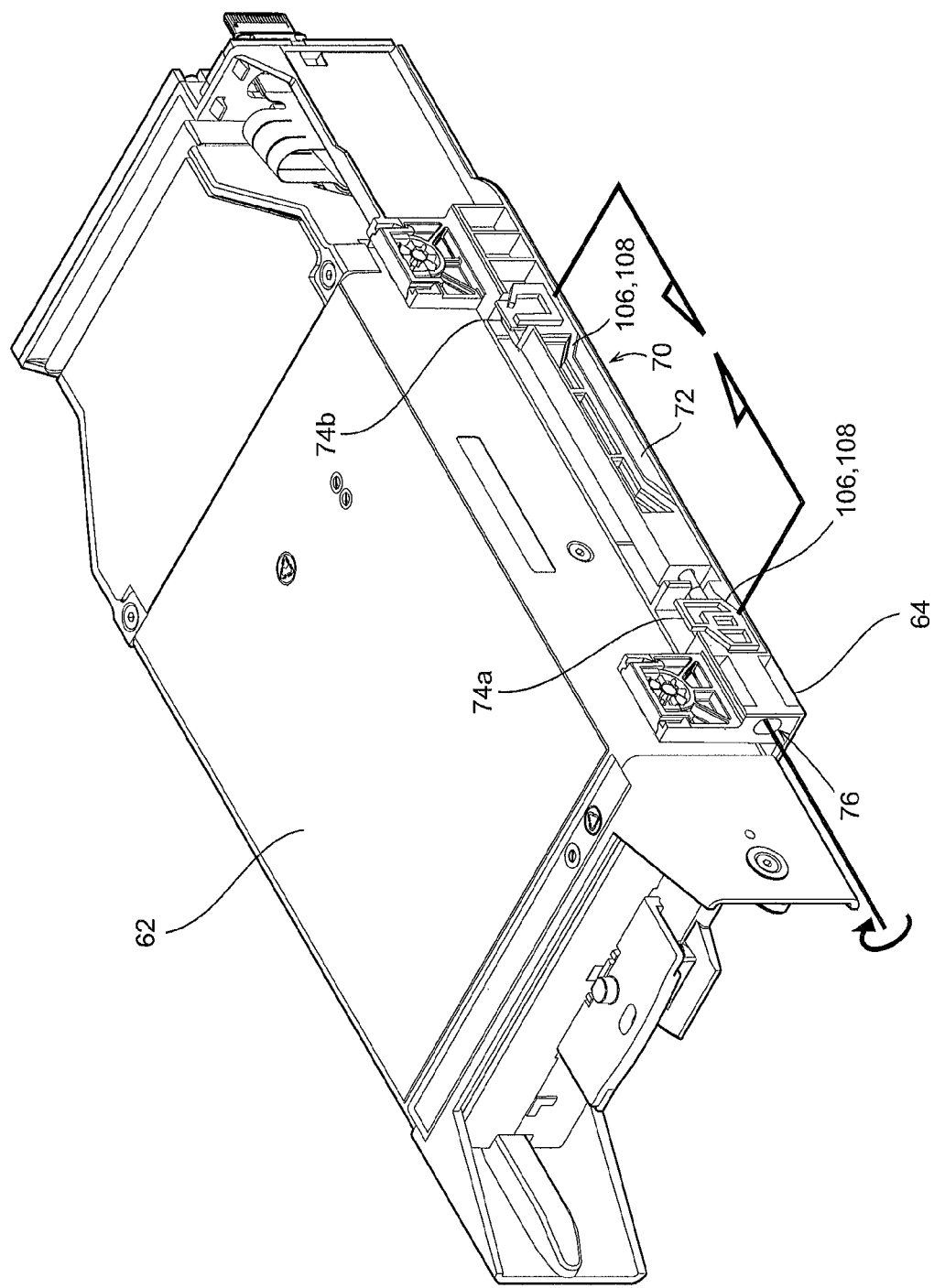
FIGS. 14 and 15 show the example of FIG. 11 in operation.
Figure 15:
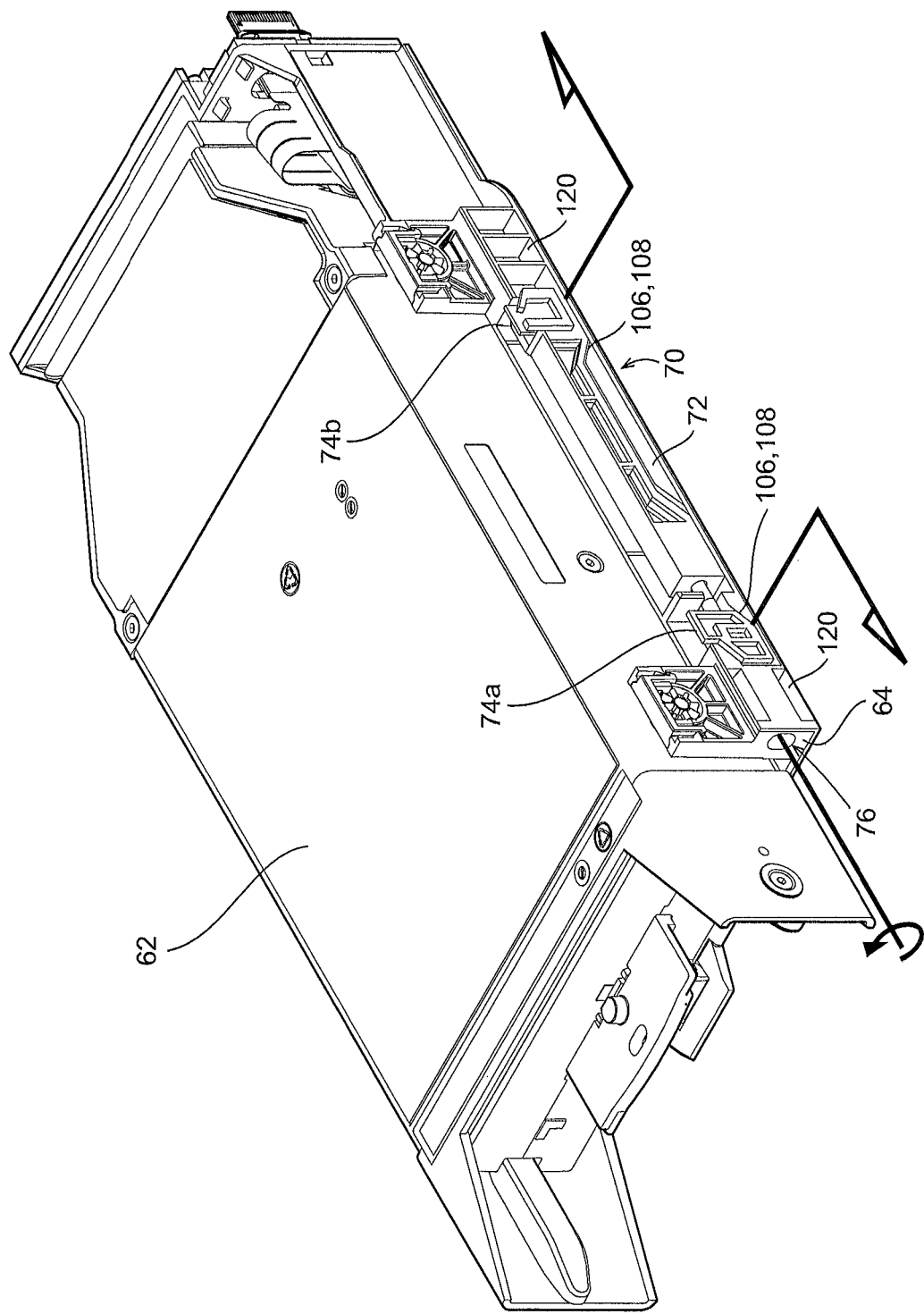

The shaft 90 has a threaded portion 94 which passes through a threaded hole in the second slider 74b and uses the head of a standard bolt captured within slider 74a, such that rotation of the actuator 76 causes the sliders 74a, 74b to be drawn forwards and backwards relative to the fixed rail member 72. The head 92 of the fastener is accessible through hold 96 in the front of the slot carrier 64. In particular, as shown in FIG. 14, rotation of the actuator 76 in one direction causes the sliders 74a, 74b to be drawn together, causing their ramps 106 to move up the respective ramps 108 on the fixed member 72 and thereby causing the rail assembly 70 to expand and clamp the channel 69. As shown in FIG. 15, rotation of the actuator 76 in the opposite direction causes the sliders 74a, 74b to be drawn apart, causing their ramps 106 to move down the respective ramps 108 on the fixed member 72 and thereby causing the rail assembly 70 to decrease in height and de-clamp the channel 69. If one slider 74a, 74b "jams" when the actuator is rotated, when the other slider has finished its travel it bottoms out against its travel stop 120, providing a reaction surface which forces the first slider 74a, 74b away from the ramp 108 to un-jam itself.

As can be seen most clearly from FIG. 16, the top contact surface 130 of the sliders 74a, 74b is inclined to match the slope of the top contact surface 104 of the channel 69. The clamping points of the fixed rail members 72 at the bottom have a plurality of adjacent V-shape grooves or protrusions 140, running front to back, in order to provide incremental clamping. This allows the clamping to accommodate tolerance differences between the structures by allowing different overlap between the clamping surfaces. FIGS. 16A and 16B show examples of clamping where there is different overlap (d1 and d2 respectively) between the contact surfaces and thus which Vs engage to accommodate tolerance. So in other words providing lots of small Vs 140 means they will key into each other with various overlap, and will only distort the structure by a maximum of the pitch of the V. Preferably the V-shape groove or grooves and projection or projections are aligned with the direction in which the carrier is inserted into the bay, i.e. front to back in the preferred embodiment.

As will be appreciated, other arrangements of clamping surfaces can be provided.

Embodiments of the present invention have been described with particular reference to the example illustrated. However, it will be appreciated that variations and modifications may be made to the examples described within the scope of the present invention.

The invention claimed is:

1. An apparatus for supporting storage devices during manufacturing, the apparatus comprising:
   structural members;
   plural slot carriers received in bays in the apparatus, each slot carrier carrying at least one slot arranged to receive a storage device, wherein the slot carriers are insertable into, or removable from, the bays through apertures at a front of the apparatus;
   clamp assemblies arranged to releasably clamp the slot carrier to one or more structural members at sides of the slot carrier; and
   a rail at each side of the slot carrier such that the slot carrier is slidably insertable into, or slidably removable from, a respective one on the bays on the rails,
   wherein a clamping mechanism provided by at least one of the rails is an expandable rail assembly, wherein the expandable rail assembly is operably expandable to clamp opposed surfaces of a channel in which the expandable rail assembly is received.

2. The apparatus according to claim 1, wherein the clamp assembly comprises an actuator by which the clamp assembly is made to clamp the slot carrier to the structural members, wherein the actuator is accessible from the front of the apparatus.

3. The apparatus according to claim 1, wherein each rail is either:
   i) fixed to or formed with at least one structural member, wherein the slot carrier provides the channel at the side for receiving the rail, or
   ii) fixed to or formed with the slot carrier, wherein at least one structural member or a member fixed thereto provides the channel at the side for receiving the rail.

4. The apparatus according to claim 1, wherein the expandable rail assembly comprises a fixed rail and a slider, wherein the slider has at least one ramp arranged to slide on a ramp of the fixed rail, wherein the expandable rail assembly is made to expand by movement of the slider relative to the fixed rail along the axis of the rail assembly such that the ramp of the slider rides up the ramp of the fixed member.

5. The apparatus according to claim 4, wherein the expandable rail assembly comprises a threaded shaft received in a threaded hole in the slider, such that rotation of the shaft causes movement of the slider relative to the fixed rail along the axis of the rail assembly.

6. An apparatus for supporting storage devices during manufacturing, the apparatus comprising:
   structural members;
   plural slot carriers received in bays in the apparatus, each slot carrier carrying at least one slot arranged to receive a storage device, wherein the slot carriers are insertable into and removable from the bays through apertures at a front of the apparatus; and one or more clamp assemblies arranged to releasably clamp the slot carrier to one or more structural members at sides of the slot carrier, wherein in a front projection, at one or each side of the slot carrier, the clamp assembly is arranged to clamp the slot carrier to the structural members at two clamping points separated by a distance d, and wherein one or more clamping points of the clamp assembly have at least one generally V-shaped groove or protrusion for mating with at least one protrusion or groove respectively on a surface being clamped.

7. The apparatus according to claim 6, wherein the one or more clamping points of the clamp assembly have a plurality of adjacent V-shape grooves or protrusions arranged to provide incremental clamping with the surface being clamped.

8. The apparatus according to claim 6, wherein each of the plurality of slot carrier has a body portion extending between the structural members, wherein in a front projection, the axis of the body of the slot carrier is generally aligned with a clamping point at one or each side of the slot carrier.

9. The apparatus according to claim 6, wherein at least one of the slot carriers has a body portion extending between the structural members, wherein in a front projection, the axis of the body of the slot carrier passes between the two clamping points at one or each side of the carrier.

10. The apparatus according to claim 6, wherein in a front projection, said separation of clamping points is in a direction that is generally aligned with the direction of the structural members.

11. An apparatus for supporting storage devices during manufacturing, the apparatus comprising:

structural members;

plural slot carriers received in bays in the apparatus, each slot carrier carrying at least one slot arranged to receive a storage device, wherein the slot carriers are insertable into, or removable from, the bays through apertures at the front of the apparatus;

one or more clamp assemblies arranged to releasably clamp the slot carrier to one or more structural members at sides of the slot carrier; and control circuitry for testing at least one of the storage devices or servo-writing to at least one of the storage devices in the slot.

12. The apparatus according to claim 11, wherein in a front projection, at one or each side of the slot carrier, the clamp assembly is arranged to clamp the slot carrier to the structural members at two clamping points separated by a distance d.

13. The apparatus according to claim 12, wherein at least one clamping point on the clamp assembly has an inclined surface for mating with an inclined surface on a surface being clamped.

14. The apparatus according to claim 12, wherein in a front projection, said separation of clamping points is in a direction that is generally aligned with a direction of the structural members.

* * * * *